United States Patent
Raivio et al.

(10) Patent No.: US 6,879,566 B1
(45) Date of Patent: Apr. 12, 2005

(54) CONNECTION ESTABLISHMENT IN A WIRELESS TELECOMMUNICATIONS NETWORK

(75) Inventors: Yrjö Raivio, Helsinki (FI); Sami Kekki, Helsinki (FI); Juha Pirkola, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/787,669

(22) PCT Filed: Sep. 20, 1999

(86) PCT No.: PCT/FI99/00770

§ 371 (c)(1),
(2), (4) Date: Mar. 21, 2001

(87) PCT Pub. No.: WO00/18157

PCT Pub. Date: Mar. 30, 2000

(30) Foreign Application Priority Data

Sep. 21, 1998 (FI) .................................................. 982029

(51) Int. Cl.⁷ ................................................. H04B 7/00
(52) U.S. Cl. .................... 370/310.1; 370/469; 370/401; 370/338
(58) Field of Search .......................... 370/310.1, 338, 370/401, 465, 469, 522

(56) References Cited

U.S. PATENT DOCUMENTS 6,374,112 B1 * 4/2002 Widegren et al. ......... 455/452.2
2004/0202172 A1 * 10/2004 Andersson et al. ...... 370/395.1

FOREIGN PATENT DOCUMENTS

| EP | 0709 994 A3 | 2/1995 |
| WO | WO 99/39528 | 8/1999 |
| WO | WO 00/18157 | 3/2000 |

OTHER PUBLICATIONS

Vinck, B. & Atea, S. (editors); Overview of UMTS Architecture, USECA:UMTS Security Architecture report, Jul. 29, 1998; pps. 1–49.

SMG2, "Submission of Proposed Radio Transmission Technologies," www.itv.int/imt/2–radio–dev/proposals/etsi/ultra.pdF, p. 1–15, (Jan. 29, 1998).

* cited by examiner

*Primary Examiner*—Chau Nguyen
*Assistant Examiner*—Nittaya Juntima
(74) *Attorney, Agent, or Firm*—Pillsbury Winthrop LLP

(57) ABSTRACT

A wireless telecommunications system comprises a radio network layer for carrying mobile-specific signaling, and a transport layer for establishing user channels between system nodes over a transport network. The transport network is visible to the radio network layer only via a primitive interface through which it can request transport services. The invisibility of the transport network to the radio network layer makes the radio network layer independent of the underlying transport network and enables the use of different transport network technologies. The radio network layer signaling procedures and connections are mapped with the underlying transport layer signaling procedures and connections by using binding information at one end of the connection leg, which is exchanged between the network and transport layers through a primitive interface, and used to "identify" the radio network layer and the transport layer connection setup signaling carried out between the nodes.

26 Claims, 2 Drawing Sheets

CONNECTION ESTABLISHMENT IN A WIRELESS TELECOMMUNICATIONS NETWORK

FIELD OF THE INVENTION

Summary of the Invention

The invention relates to wireless telecommunications systems.

In mobile networks, radio interfaces have conventionally been narrow-band. Mobile network transmission systems have conventionally been implemented with circuit-switched connections using a star or tree network configuration. An example of prior art mobile systems is the pan-European digital mobile communication system GSM. The signalling interface is based on an ANSI/CCITT signalling system number 7 (SS7) comprising several layers: an SCCP, an MTP and a physical layer. When a digital PCM link is used between the BSC and the mobile switching centre 10, the signalling of the physical layer is transferred in one or more time slots of 56 or 64 kbit/s. The following higher layers in interface A are an MTP (message transfer part) and an SCCP (signalling connection and control part). The MTP and the SCCP are used to support layer 3 signalling messages between the mobile switching centre and the base station system BSS. One function of the SCCP, BSS-MAP (BSS management application sub-part), supports procedures between the mobile switching centre and the BSS relating to the mobile station (handover control 14 ms) or a cell within the BSS or the entire BSS. In other words, the BSSMAP (RSMAP; Radio System Management Application Part) supports all the procedures between the mobile switching centre and the BSS requiring interpretation and handling of information associated with individual calls and resources management, i.e. radio network-specific or mobile-specific information. In the terminology used in this description, the BSSMAP may be called a radio network layer and the underlying PCM transmission system a transport layer. In GSM, the transport layer reference, i.e. the PCM timeslot number information, is carried in the BSS-MAP signalling.

At present, third-generation mobile systems, such as the Universal Mobile Communication System (UMTS) and the Future Public Land Mobile Telecommunication System (FPLMTS), later renamed as IMT-2000 (Interna-tional Mobile Telecommunication 2000), are being developed. The UMTS is being standardized in ETSI (European Telecommunication Standards Institute), whereas ITU (International Telecommunication Union) is defining the IMT-2000 system. These future systems are basically very much alike.

Figure 1:
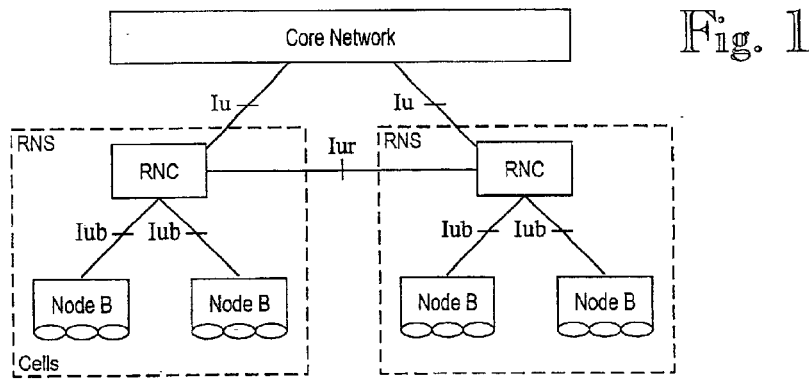
FIG. 1 shows a simplified UMTS architecture with external reference points and interfaces to the UMTS Terrestrial Radio Access Network, UTRAN. The UTRAN consists of a set of Radio Network Subsystems RNS connected to the Core Network CN through an Iu. These Radio Network Subsystems can be interconnected through an interconnection point (reference point) Iur. The interface Iu(s) and Iur are logical interfaces, Iur can be conveyed over a direct physical connection between RNSs or via any suitable transport network. Each RNS is responsible for the resources of its set of cells. In each connection between a User Equipment UE and the UTRAN, one RNS is the Serving RNS. An RNS consists of a Radio Network Controller RNC and one or more abstract entities currently called Node B. The RNC is responsible for the handover decisions that require signalling to the UE. Node Bs are connected to the RNC through the Iub interface. The functions and internal structure of Node Bs are currently undefined. The core network CN is a conventional or future telecommunication network modified to efficiently utilize the UTRAN in a wireless communication. Telecommunication networks that are thought to be suitable core networks are second-generation mobile systems, such as GSM, ISDN (Integrated Services Digital Network), B-ISDN (Broadband ISDN), PDN (Packet Data Network), ATM.

The UTRAN forms an overlay layer for the transmission network. The basic idea is that the UTRAN is a transmission independent system including 3 different system functions: user plane, radio network control plane (radio network layer) and access link control plane (transport plane). The user plane transmits circuit and packet switched data, the radio network control plane provides the means to carry mobile-specific signalling, and the transport network control plane establishes the user channels over the UTRAN interfaces, e.g., $I_u$, $I_{ur}$ and $I_{ub}$. The radio network control plane and the user plane use the services of the transport network control plane. The transport network control plane hides the underlying transport network from the UTRAN control plane. The transport network is visible to the radio network control plane only via the primitive interface through which it can request the transport services for itself and for the UTRAN user plane. The transport network control plane provides the requested transport Service Access Points (SAP) for the UTRAN user and control planes.

The invisibility of the transport network to the UTRAN radio network layer makes the UTRAN independent of the underlying transport network and it enables the use of different transport network technologies for the UTRAN. This independence is seen beneficial from the UTRAN specification and development work point of view as it is no longer tied to any specific transport technology. Furthermore, it makes the UTRAN more adaptive to the future developments of the transport technologies.

A potential candidate for transport technique is the UMTS is ATM (Asynchronous Transfer Mode). The ATM transmission technique is a switching and multiplexing solution particularly relating to a data link layer (i.e. OSI Layer 2, hereinafter referred to as an ATM layer), enabling the implementation of a connection-oriented packet network in the B-ISDN networks (Broadband Integrated Services Digital Network). In ATM data transmission, the end user's data traffic is carried from a source to a destination through virtual connections. Data is transferred over switches of the network in standard-size packets called ATM cells. An ATM cell comprises a header, the main object of which is to identify a connection number for a sequence of cells forming a virtual channel for a particular call. A physical layer (i.e. OSI Layer 1) may comprise several virtual paths multiplexed in the ATM layer. The virtual paths are identified by a Virtual Path Identifier (VPI). Each virtual path may comprise a number of virtual channels identified by a Virtual Channel Identifier (VCI). The ATM cell comprises indirectly information on the receiver's address, each cell thus being an independent data transmission unit. Above the ATM layer, there are the procedures of the ATM Adaptation Layer (AAL) which adapt the ATM layer to the higher layers. The ATM is a connection-oriented traffic technique, but since there is no connection before it is established, a connection establishment request has to be routed from a source through the ATM network to a destination approximately in the same way as packets are routed in packet-switched networks.

After the connection has been established, the packets travel along the same virtual path during the connection.

In other words, separate transport layer signalling is required for connection establishment when the transport layer is based on ATM, for example. Such an established connection is called a signalled connection herein. In some cases, both signalled and permanent connections (permanent virtual connection in ATM, or a TDM time slot, for example) may be used.

Other potential transport techniques are Frame Relay and Internet protocol (IP).

An object of the present invention is to allow independence of the radio network layer, such as the UTRAN, from the underlying transport layer, such as the ATM, while enabling coordination of the separate signalling procedures through a generic interface between these layers.

An aspect of the invention is a connection establishment method in a wireless telecommunications system comprising a radio network layer for carrying radio network-specific signalling and a transport layer for establishing user connections over a transmission system between network nodes in the telecommunications system, said method comprising the steps of requesting, by the radio network layer, the transport layer to establish a user connection between two nodes; carrying out a transport layer signalling procedure for establishing a transport layer connection; and carrying out a network layer signalling procedure for establishing a radio network layer connection establishment. The method further comprises the steps of providing binding information for a user connection requested by the radio network layer; utilizing the binding information in said transport layer signalling procedure; utilizing the binding information in said radio network layer signalling procedure; and utilizing the binding information in the nodes to associate the transport layer signalling procedures and connections with the respective network layer signalling procedures and connections.

A further aspect of the invention is a wireless telecommunications system comprising a radio network layer for carrying radio network-specific signalling and a transport layer for establishing user connections over a transmission system between network nodes in the telecommunications system, the radio network layer signalling procedures being substantially separated from the transport layer signalling procedures. One of the two nodes is arranged to provide binding information for a user connection requested by the radio network layer, and both the radio network layer and the transport layer are arranged to use the binding information in the signalling associated with the connection establishment in order to enable the network nodes at the ends of the user connection to associate the transport layer signalling and connections with the respective network layer signalling and connections.

In accordance with the invention, the radio network layer signalling procedures and connections are associated with the underlying transport layer signalling procedures and connections by using binding information. The binding information associates a particular transport layer instance with its corresponding radio network layer instance. The binding information is provided in a system node at one end of the connection leg, exchanged between the network and transport layers in addition to other necessary parameters through a primitive interface, and used to "identify" the radio network layer and the transport layer connection setup signalling carried out between the nodes. As a result, the signalling procedures and connections of the two independent and separate layers are mapped together.

Either the originating or the terminating node may manage the allocation of the binding information and the corresponding transport resources but not both nodes at the same time. According to an embodiment of the invention the radio network layer will request a transport resource from the transport layer. The transport layer will return binding information to the requesting network layer entity which will send it with radio network layer signalling to the other node. Simultaneously a new transport layer connection is established by transport layer signalling in which this same binding information is also transmitted to the other node. If the originating node of the radio network layer does not allocate transport resources, some specific binding information shall be used, e.g. 0, or the whole binding information parameter is left out in the request message sent by the originating node. In that case, the terminating node will allocate the binding information and send it back to the originating node within the acknowledgement message. This message can be a Layer 3 Proceeding message, for example.

The binding information may be dynamic in the sense that it is allocated just before the connection is established. The binding information has to be unique at least between the neighboring nodes. Normally, one node may receive from a plurality of other nodes. Therefore, the management of the binding information values in the network will be facilitated, if it is the terminating node which allocates the resources and the binding information.

In one embodiment of the invention the transport network may use both signalled connections and permanent type of connections. In that case, some binding information values may be static, i.e. they permanently have an indirect reference to some transport resources. The binding information values are allocated for each pipe while the permanent resource is established by management commands or signalling. These permanent binding information values have to be informed to both nodes by the management system or signalling respectively. Each node has to keep a reference table where binding information values are tied to some physical resource. In other words, these resources are just waiting for network layer requests and they are taken into use without any dynamic signalling in the transport layer. When a permanent connection is taken into use, it is marked reserved and a corresponding binding information value is retrieved from the reference table and transferred to the radio network layer. This approach can be very useful, for example in handover cases, as response time for the transport connection establishment is very short. The nodes may be arranged to use the permanent connections based on various criteria: always when available, when preferable according to a predetermined criterium, when no signalled connections are available, or in handover.

Figure 2:
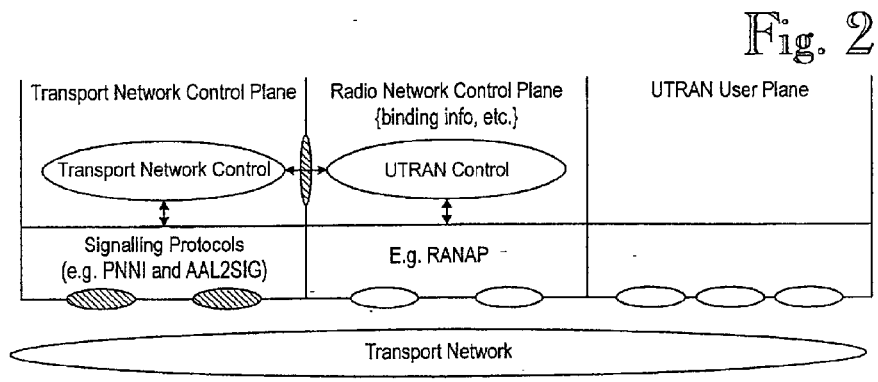
Figure 3:
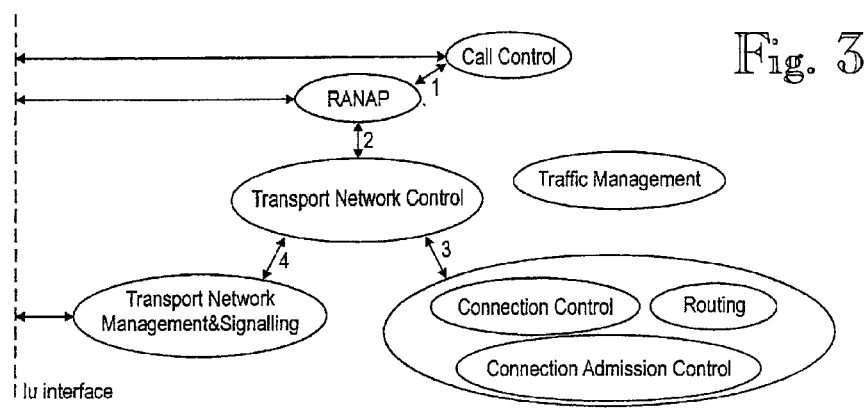
Figure 4:
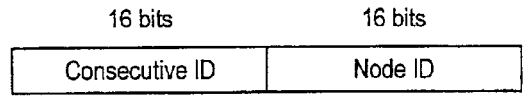

In the following, the invention will be described in greater detail by means of the preferred embodiments with reference to the accompanying drawings, in which FIG. 1 shows a simplified UMTS architecture, FIG. 2 illustrates the UTRAN reference model in the case of the transport network that is based on the ATM, FIG. 3 illustrates an example of internal functions in the MSC (Mobile Services Switching Center) node, FIG. 4 shows one example of the binding ID structure, FIGS. 5, 6, 7 and 8 illustrate the various signalling procedures according to the invention.

DETAILED DESCRIPTION OF A PREFERRED EMBODIMENT OF THE INVENTION

The preferred embodiments of the invention are in the following described as implemented in the UMTS system when the transport network is an ATM network. However, the aim is not to restrict the invention to these embodiments. The invention is applicable to any wireless telecommunication system requiring independence of the radio network (mobile-specific signalling) from the underlying transport network type.

An architecture of a UMTS access network was described above with reference to FIG. 1. FIG. 2 illustrates the UTRAN reference model in the case of the transport network that is based on the ATM. In the terminology used herein, the radio network control plane is the radio network layer, and the Transport Network Control (TNC) plane and the transport network provide the transport layer.

The Transport Network Control Plane is designed for the ATM-based transport network. Both the standardized ATM Connection Control signalling (PNNI, UNI, BISUP) and the AAL2 signalling protocols (ATM Adaptation Layer, type 2) are available for use by the Transport Control application in order to provide the requested transport services. It is emphasized that the complexity and the capabilities of the Transport Network Control Plane may vary depending on the capabilities of the underlying transport network and on the required services of any particular transport network. For example, the ATM signalling may not be necessary if all communication is based on the use of Permanent Virtual Connections and/or if only AAL2 connections are controlled via signalling.

In the radio network control plane, the radio network signalling over the interface $I_u$ consists of the Radio Access Network Application Part (RANAP). The RANAP consists of mechanisms to handle all procedures between the CN and the UTRAN. It is also capable of conveying messages transparently between the CN and the UE without interpretation or processing by the UTRAN. The corresponding signalling information across the $I_{ur}$ interface is called Radio Network Subsystem Application Part (RNSAP). The present invention is applicable to all interfaces in the UTRAN.

The Transport Network Control Plane provides the capabilities and mechanisms that are needed in order to efficiently use any specific transport network for the communication needs of the UTRAN control and user planes. These capabilities may include e.g. the Traffic Management (Connection Admission Control, User Parameter Control, etc.) and Connection Control functions. The interaction of the Transport Network Control Plane with the underlying transport network is provided by the transport network-specific signalling protocols. UTRAN-specific procedures have access to the Transport Control Plane through the primitive interface. The primitive interface exists between the Transport Control application and the corresponding UTRAN control application (the UTRAN control application resides on both sides of the system interface, including the $I_u$). The Transport Control is the application that coordinates all the functions of the Transport Network Control Plane.

Transport services are requested from the Transport Network Control Plane by the UTRAN control. The Transport Control application converts the parameters to the formats that are suitable for the underlying transport network. The conversion may be needed e.g. between the UTRAN addressing and the addressing format that is supported by the transport network. Also, the parameters that characterize the requested transport service (e.g. the UTRAN bearer parameters) may need to be adapted to the transport network-specific parameters. The description of the primitives and the parameters that are passed through this interface are not relevant to the present invention and will not be described herein.

The binding information according to the present invention is exchanged between the two planes in addition to other necessary parameters. Binding information associates a particular Transport Network Control Plane instance with its corresponding radio network control plane instance. In the following, the binding information is called a binding ID.

FIG. 3 illustrates an example of internal functions in the MSC (Mobile Services Switching Center) node and interactions which may be made in the connection setup. In a node signalling over the $I_{ur}$ interface the basic function and primitive interfaces may the same but RANAP is replaced by RNSAP. In the MSC node, the Transport Control has, in addition to the interface to the RANAP, several other internal interfaces. The whole connection establishment procedure starts with Call Control negotiation between MSC and MS call control entities. By using the RANAP services, the radio resources are checked and when agreed by the MSC and the MS, then the RANAP will request access links from the Transport Network Control. That request includes generic bearer parameters and they are not tied to any certain transmission alternative. Basically, radio and access link resources could be checked and reserved simultaneously to get the shortest delay. Depending on the connection and traffic management parameters in the RANAP request, the TNC will first decide the access link type. After that, the Transport Control will utilize internal node control services to find out if that request can be fulfilled with the chosen access link type. That includes the Connection Control and Connection Admission Control blocks shown in FIG. 3. Routing towards the destination also has to be formed. If the RANAP request is valid, the TNC decides how this link will be established. Alternatives may be to use signalled or permanent or both link types together. After the transport link is established, the TNC will response with an (internal) acknowledgement to the RANAP and also give the binding ID to be transmitted over the RANAP connection for the other node. With the binding information, the other node can connect the TNC link to the RANAP connection.

The format of the binding ID is preferably such that both the radio network control plane protocol and the relevant transport Layer signalling protocol (Q.2931, Q.933, Q.AAL2, etc.) can transparently convey it in their information element, typically in a user-to-user information element. For example, currently in AAL2 signalling only 32 bits are allocated for the user-generated information field.

The binding ID is preferably unique at least between the neighboring nodes. For example, individuality of the binding ID can be ensured by means of a node identifier, Node ID. This is a unique identifier for each node in the UMTS system. The numbering system can be operator-specific and it may based for example on signalling point codes, ATM or AAL2 End System Addresses.

Besides the unique part, the binding ID may include a consecutive number which is allocated and managed by a Resource Manager in each node. Some of these numbers can be permanently allocated for some special purpose but this is a totally implementation-specific issue. FIG. 4 shows one example of the binding ID structure. The total length is 32 bits where both the Node ID and consecutive ID have a number space of 16 bits allowing 65 535 different binding IDs for each connection leg between two nodes.

In the following, four different scenarios for binding the radio network layer and transport layer signalling according to the invention will be described with reference to FIGS. 5 to 8. The specific messages shown are only intended to illustrate the invention but similar messages can be found in the network and transport signalling procedures.

Figure 5:
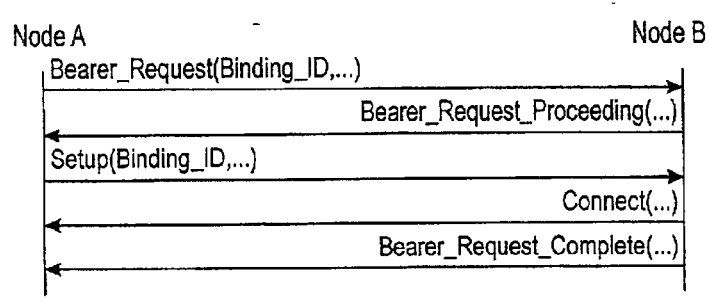

FIG. 5 describes the case where the originating side node A allocates the transport resource. The binding ID is requested from the node A Resource Manager and that value is inserted into Bearer_Request messages which are sent to the node B. Depending on the interface requirements, there can be a Layer 3 Proceeding message sent back from the node B. This message can be useful if node B wants to change the transport features or to give some transport addressing information to the node B. If the Layer 3 Proceeding message is not used, a transport Setup which contains the same binding ID can be sent immediately after the Bearer Request message. If the Proceeding message is specified for the interface, the transport Setup message is not sent before the arrival of the Proceeding message, as the latter may contain some information necessary for the transport selection procedure. This kind of transport negotiation procedure has been planned for the $I_u$ Interface, for example. Even in case we have to change the transport resources, the binding ID can still be the same. Only the internal reference of the binding ID has to be updated for the new resource. Basically, the new resource has to be lower than the originally allocated resource. This means that the node B may only lower the transport requirements from the one the node A is offering. It should be noted that the radio network layer and transport layer signalling may not be tied together but they may be processed parallel. The node B will not send a Bearer_Request_Complete message as an acknowledgement before the establishment of both the radio and transport resources is completed. The radio signalling is not shown here. As the Connect message of the transport layer and the Bearer_Request_Complete message of the radio network layer are not synchronized, the node A has to wait until both messages arrive before it can proceed with the following procedures.

Figure 6:
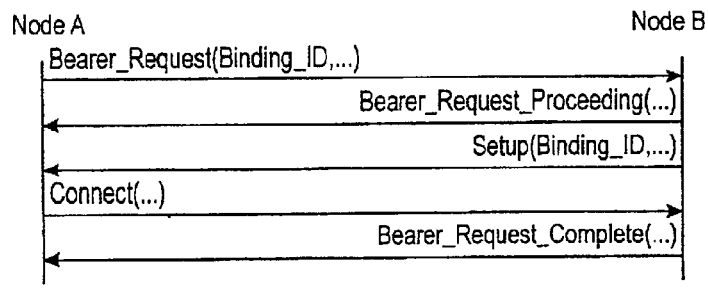

FIG. 6 shows an alternative solution where the originating side node A allocates the transport resource and the binding ID as described above with reference to FIG. 5. However, in FIG. 6, the node A sends only the network layer Bearer_Request message with the binding ID to the node B. As a response, the transport layer Setup message with the same binding Id and the Layer 3 Proceeding message are sent by the node B to the node A. The node A acknowledges it with the transport layer Connect message. Finally, the node B acknowledges this with the radio network layer Bearer_Request_Complete message. This approach may be useful if parallel operation is not found good, but input-output message sequences are considered important.

Figure 7:
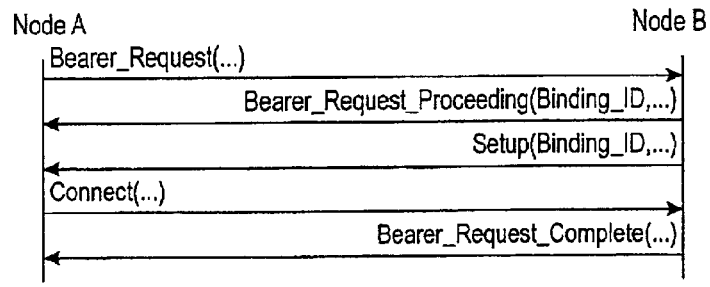

In the third example shown in FIG. 7, the transport resources are allocated by the terminating side node B. In this case, the node A will not allocate the binding ID nor send the transport layer Setup message and thus a special value, "No_Binding_ID_Value", can be used in the Binding ID field of the network layer Bearer_Request message, or the Binding ID parameter may not be included at all in the message. The node B will, in response to the Bearer_Request message, allocate the requested transport resource and return the Binding ID in a radio network layer acknowledgement message which in this example is the Bearer_Request_Proceeding message. Simultaneously, a transport layer Setup message including the same Binding ID is sent from the node B to the node A. The node A acknowledges this with the transport layer Connect message. Finally, as the radio and transport resources are completed, the radio network layer Bearer_Request_Complete message is sent from the node B to the node A. This approach, in addition to the benefits of the parallel processing, facilitates the management of the unique binding ID values in the system.

Figure 8:
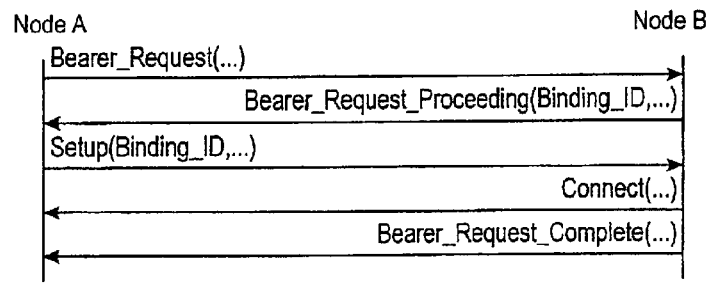

The final scenario is shown in FIG. 8. In this case the node A does not allocate the binding ID but only sends the network layer Bearer_Request message as in the FIG. 7. Again, the node B will, in response to the Bearer_Request message, allocate the requested transport resource and return the Binding ID in the radio network layer Bearer_Request_Proceeding message. However, the node B does not send a transport layer Setup message. Instead, the node A sends the transport layer Setup message with the same binding ID in response to the radio network layer Bearer_Request_Proceeding message. The node B acknowledges it with the transport layer Connect message. Finally, the radio network layer Bearer_Request_Complete message is sent from node B to the node A. This procedure can be useful if parallel processing of the radio network layer and transport messages is not possible, or appropriate message synchronizing of the radio network layer and transport messages is seen important. Also, the benefits of allocating the binding ID at the terminating node B are obtained.

If the node A or node B allocates permanent transport resources, procedures can be exactly the same as described above, except that the transport layer Setup-Connect sequence would be left out. Binding ID would tell both ends the indirect reference to the actual physical transport resource.

The binding ID parameter can be conditional in all relevant radio network layer messages in order to allow all the scenarios described above. In each interface in the system one or more of the previous procedures may be applied, and the selected procedure will define in which network layer messages the binding ID information element is needed.

The application has above been described by means of the preferred embodiments to illustrate the principles of the invention. Regarding the details, the invention may vary within the scope and spirit of the accompanying claims.

What is claimed is:

1. A connection establishment method in a wireless telecommunications system including a radio network layer associated with carrying radio network-specific signaling and a transport layer associated with establishing user connections over a transmission system between network nodes in the telecommunications system, the method comprising:
   requesting, via the radio network layer, the transport layer to establish a user connection between network nodes;
   carrying out a transport layer signalling procedure to establish a transport layer connection;
   carrying out a network layer signalling procedure to establish a radio network layer connection;
   providing binding information associated with the user connection requested by the radio network layer;
   utilizing the binding information in the transport layer signalling procedure;
   utilizing the binding information in the radio network layer signalling procedure; and
   utilizing in the network nodes, the binding information to associate the transport layer signalling procedure and connection with a corresponding network layer signalling procedure and connection.

2. The method of claim 1, wherein the binding information is provided to the radio network layer via the transport layer.

3. The method of claim 1, further comprising dynamically allocating, via the transport layer, the binding information to each connection to be established by signalling.

4. The method of claim 1, further comprising ending the radio network layer signalling procedure via a request complete message only after completion of the transport layer signalling procedure and establishment of radio resources and transport resources.

5. The method of claim 1, further comprising:
allocating the binding information only in one of the network nodes associated with the user connection; and
sending the allocated binding information to another one of the nodes associated with the user connection in at least one of a radio network layer message and a transport layer message.

6. The method of claim 5, further comprising allocating the binding information in terminating one of the network nodes associated with the user connection.

7. The method of claim 1, wherein the allocated binding information is unique at least between the network nodes associated with the user connection.

8. The method of claim 7, wherein the binding information includes a node identity.

9. The method of claim 1, further comprising:
checking, in at least one of the network associated with the user connection, whether there is a pool of permanent transport layer connections between the network nodes;
allocating to the requested user connection one permanent connection from the pool instead of establishing a signalled connection by the transport layer signalling procedure;
informing the binding information associated with the allocated permanent connection to the radio network layer;
receiving, in another one of the network nodes associated with the user connection, the binding information from the radio network layer, the binding information being carried from the one network node to the other network one of the nodes in the radio network level signalling;
allocating, in the other one of the network nodes associated with the user connection, for the requested user connection, the permanent connection associated with the binding information; and
utilizing in the nodes the binding information to associate the permanent transport layer connections with corresponding network layer signalling procedures and connections.

10. A wireless telecommunications system comprising:
including at least two network nodes configured to be connected via at least one user connection,
wherein:
the at least one user connection is established via a transport layer and radio network-specific signalling is carried via a radio network layer,
radio network layer signalling procedures are substantially separated from transport layer signalling procedures,
one of the network nodes is configured to provide binding information associated with a user connection requested by the radio network layer, and
both the radio network layer and the transport layer are configured to use the binding information in signalling associated with network node connection establishment to enable network nodes connected via a user connection to associate transport layer signalling and connections with corresponding network layer signalling and connections.

11. The system of claim 10, wherein at least one of the network nodes connected via the user connection is configured to dynamically allocate the binding information associated with that user connection.

12. The system of claim 11, wherein the at least one network node associated with the user connection is configured to send the dynamically allocated binding information to the other one of the nodes connected via the user connection in at least one of a radio network layer message and a transport layer message.

13. The system of claim 12, wherein the node configured to send the dynamically allocated binding information is a terminating node.

14. The system of claim 10, further comprising:
permanent transport layer connections between some of the network nodes, each permanent connection being fixedly associated with preallocated binding information,
wherein, the network nodes connected to permanent transport layer connections are each configured to store reference information associating the preallocated binding information with the associated permanent connection, and wherein the nodes connected to permanent transport layer connections are configured to use the permanent connections based on availability criteria.

15. The system of claim 10, wherein a transport technique associated with the transport layer is one of Asynchronous Transfer Mode, Internet Protocol, Frame Relay, and Time Division Multiplexing.

16. The system of claim 10, wherein the binding information is unique at least between two network nodes associated with a user connection.

17. The system of claim 14, wherein the availability criteria dictates always using the associated permanent connection when the permanent connection is available.

18. The system of claim 14, wherein the availability criteria dictates using the associated permanent connection when preferable according to a predetermined criterion.

19. The system of claim 14, wherein the availability criteria dictates using the associated permanent connection when no signalled connections are available.

20. A network node for a wireless telecommunications system including a radio network layer associated with carrying radio network-specific signalling and a transport layer associated with establishing user connections at a radio network layer level and at a transport layer level, respectively, over a transmission system between said network node and another node in the telecommunications system, signalling procedures of the radio network layer being substantially separate from signalling procedures of the transport layer, wherein
said network node is configured to provide to, or obtain from, the other network node binding information associated with a user connection requested by the radio network layer, said binding information associating a particular transport layer instance with a corresponding radio network layer instance, and
said radio network layer and said transport layer at said network node are configured to use the binding information in signalling associated with the connection establishment and to exchange it between each other in order to enable said network node and said other node at the ends of the user connection to associate transport layer signalling and connections with corresponding network layer signalling and connections.

21. The network node of claim 20, wherein said network node is configured to dynamically allocate the binding information for each user connection.

22. The network node of claim 20, wherein said network node is configured to send the binding information to the other node in at least one radio network layer message or transport layer message.

23. The network node of claim 22, wherein said network node comprises the terminating one of the two nodes.

24. The network node of claim 20, wherein said network node is arranged to obtain the binding information from the other node in at least one radio network layer message or transport layer message.

25. The network node of claim 20, comprising at least one permanent transport layer connection to the other network node, the at least one permanent connection being fixedly associated with preallocated binding information, said network node being further configured to store reference information tying the preallocated binding information to the respective permanent connection, and to use the at least one permanent connection based on one or more of the following criteria: always when available, when preferable according to a predetermined criterion, and when no signalled connections are available.

26. The network node of claim 20, wherein a transport technique associated with the transport layer is one of Asynchronous Transfer Mode, Internet Protocol, Frame Relay, and Time Division Multiplexing.

* * * * *